United States Patent
Deaton et al.

(10) Patent No.: US 8,078,162 B2
(45) Date of Patent: Dec. 13, 2011

(54) AIRBORNE WIRELESS COMMUNICATION SYSTEMS, AIRBORNE COMMUNICATION METHODS, AND COMMUNICATION METHODS

(75) Inventors: Juan D. Deaton, Menan, ID (US); Michael J. Schmitt, Idaho Falls, ID (US); Warren F. Jones, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1082 days.

(21) Appl. No.: 11/870,357

(22) Filed: Oct. 10, 2007

(65) Prior Publication Data

US 2009/0098850 A1 Apr. 16, 2009

(51) Int. Cl.
*H04W 4/00* (2009.01)
*H04M 11/04* (2006.01)
*H04M 1/00* (2006.01)

(52) U.S. Cl. ............. 455/431; 455/404.1; 455/561

(58) Field of Classification Search .......... 455/8, 445, 455/12.1, 422.1, 561, 427–431, 404.1, 423–424, 455/426.1
See application file for complete search history.

(56) References Cited

U.S. PATENT DOCUMENTS

| | | | |
|---|---|---|---|
| 4,152,647 A | | 5/1979 | Gladden et al. |
| 6,650,898 B2 * | | 11/2003 | Jochim et al. ............. 455/431 |
| 6,795,686 B2 * | | 9/2004 | Master et al. ............. 455/11.1 |
| 6,795,699 B1 | | 9/2004 | McCraw et al. |
| 6,804,515 B1 | | 10/2004 | McCraw et al. |
| 6,856,803 B1 | | 2/2005 | Gross et al. |
| 6,891,813 B2 | | 5/2005 | Feria et al. |
| 6,941,138 B1 | | 9/2005 | Chang |
| 6,944,450 B2 | | 9/2005 | Cox |
| 6,968,187 B1 | | 11/2005 | Irwin et al. |
| 7,006,816 B2 * | | 2/2006 | Remy ..................... 455/404.2 |
| 7,103,317 B2 | | 9/2006 | Chang et al. |
| 7,107,062 B2 * | | 9/2006 | Cruz et al. ................. 455/453 |
| 7,558,569 B2 * | | 7/2009 | Chang et al. .............. 455/428 |
| 7,715,838 B2 * | | 5/2010 | Swensen et al. ........... 455/428 |
| 7,801,521 B2 * | | 9/2010 | Dent ........................... 455/431 |
| 2003/0078037 A1 * | | 4/2003 | Auckland et al. .......... 455/422 |
| 2006/0009262 A1 * | | 1/2006 | Hamm ....................... 455/561 |
| 2007/0021060 A1 * | | 1/2007 | Karabinis et al. .......... 455/12.1 |
| 2007/0042772 A1 * | | 2/2007 | Salkini et al. .............. 455/431 |
| 2007/0155375 A1 * | | 7/2007 | Kappel et al. ............. 455/422.1 |
| 2007/0258417 A1 * | | 11/2007 | Harvey et al. .............. 370/338 |
| 2007/0281705 A1 * | | 12/2007 | Bosenbecker .............. 455/445 |

(Continued)

OTHER PUBLICATIONS

Oodo, M. Tsuji, H. Miura, R. Maruyama, M. Suzuki, M. Nishi, Y. Sasamoto, H.: Experiments on IMT-2000 Using Unmanned Solar Powered Aircraft at an Altitude of 20 km , IEEE, Jul. 2005 vol. 54 Issue 4.

(Continued)

*Primary Examiner* — Brandon Miller
(74) *Attorney, Agent, or Firm* — Traskbritt

(57) ABSTRACT

An airborne wireless communication system includes circuitry configured to access information describing a configuration of a terrestrial wireless communication base station that has become disabled. The terrestrial base station is configured to implement wireless communication between wireless devices located within a geographical area and a network when the terrestrial base station is not disabled. The circuitry is further configured, based on the information, to configure the airborne station to have the configuration of the terrestrial base station. An airborne communication method includes answering a 911 call from a terrestrial cellular wireless phone using an airborne wireless communication system.

27 Claims, 5 Drawing Sheets

U.S. PATENT DOCUMENTS

2008/0085691 A1* 4/2008 Harvey et al. .............. 455/187.1

OTHER PUBLICATIONS http://gltrs.grc.nasa.gov/ Colozza, A., Dolce, J.L: High-Altitude, Long-Endurance Airships for Coastal Surveillance, NASA/TM—2005-213427, Feb. 2005.

http://fiallfoss.fcc.gov/edocs_public/attachmatch/DA-06-2037A1.pdf: FCC Requests Nominations for Membership on the Commercial Mobile Service Alert Advisory . . . Oct. 16, 2006.

http://ieeexplore.ieee.org/xpl/freeabs_all.jsp?tp=&arnumber=846086, Colella, M.J., Martin, J.N., and Akyildiz, F.: "The Halo Network," IEEE Communications Magazine, vol. 38, Issue 6, Jun. 2000. pp. 142-148.

http://eng.guanri.com.cn/english/product3.jsp, 2007.

http://www.proxyge.com/37/, Cyber Aerospace website, "About Cyber Aerospace," "AeroSphere Airships," "Cyber Scout UAV's" 2005.

http://www.sanswire.com/index.htm, Sanswire- Delivering Tomorrow's Communications Networks Today, "Military & government technology" 2006.

http://www.plfm.net/newsletter.php?id=07, Platforms Wireless International Corporation Homepage, Oct. 8, 2007.

http://www.plfm.net/pdf/plfm/recom 911_web_site.pdf, Miles, Donna: "DoD—Katrina Lessons, Paul McHale Assistant Secretary of Defense Pentagon Address" Feb. 6, 2006.

Djuknic, G.M et al: "Establishing wireless communications services via high altitude aeronautical platforms: a concept whose time has come?"—IEEE Commun. vol. 35 Iss9, Sep. 1997.

http://www.lockheedmartin.com/data/assets/7966.pdf HAA webpage, Mar. 2004.

http://www.qualcomm.com/qgov/products/pdf/QDBS.pdf, Product Specification page for Qualcomm QDBS Deployable CDMA Cellular System, Feb. 2005.

http://www.tlc-consulting.com/documents/ignslisk.pdf, Product Specification page for TLCS IGN, Oct. 25, 2006.

http://www.plfm.net/pdf/plfm/arc_web_site.pdf Platforms Wireless, ARC slideshow, pp. 1-9, Oct. 16, 2006.

http://www.plfm.net/newsletter.php?id=07_07-30-Resetta_911_first_sales.php Press Release from Platforms Wireless regarding Rosetta 911, pp. 1-15, Apr. 22, 2007.

http://www.plfm.net/pdf/plfm/aerostat_web_site.pdf Platforms Wireless Aerostat slideshow, pp. 2-9, Oct. 16, 2006.

* cited by examiner

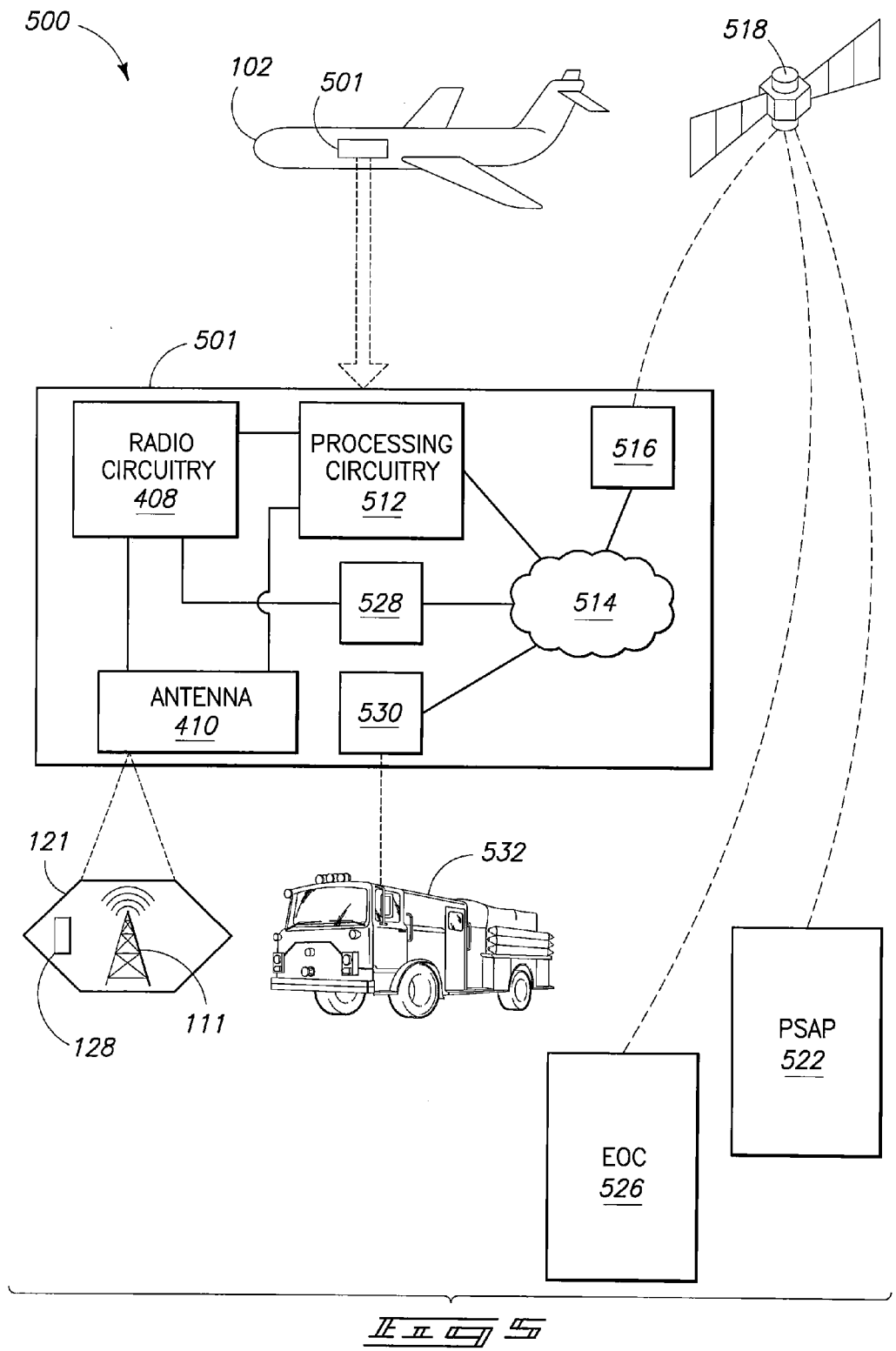

AIRBORNE WIRELESS COMMUNICATION SYSTEMS, AIRBORNE COMMUNICATION METHODS, AND COMMUNICATION METHODS

CONTRACTUAL ORIGIN OF THE INVENTION

This invention was made with government support under Contract Number DE-AC07-05ID14517 awarded by the United States Department of Energy. The government has certain rights in the invention.

TECHNICAL FIELD

The present disclosure relates to airborne wireless communication systems, airborne communication methods, and communication methods.

BACKGROUND OF THE DISCLOSURE

Reliance on wireless telephone service is widespread. However, wireless telephone service may be interrupted when wireless base stations used to provide wireless telephone service become inoperable. In some situations, a wireless service provider may quickly restore wireless telephone service by repairing an inoperable base station.

However, in other situations, natural disasters or other events may prevent the wireless service provider from restoring service for an extended period. For example, the wireless service provider might not be able to remedy power outages and/or communication circuit outages for several days or weeks. During these times of service outage, people might not be able to call a 911 operator using a wireless phone. Consequently, loss of property, severe injury, and/or death may result.

BRIEF DESCRIPTION OF THE DRAWINGS

Preferred embodiments of the disclosure are described below with reference to the following accompanying drawings.

FIG. 5 is an illustrative representation of an emergency communication system according to one embodiment.

DETAILED DESCRIPTION

Figure 1:
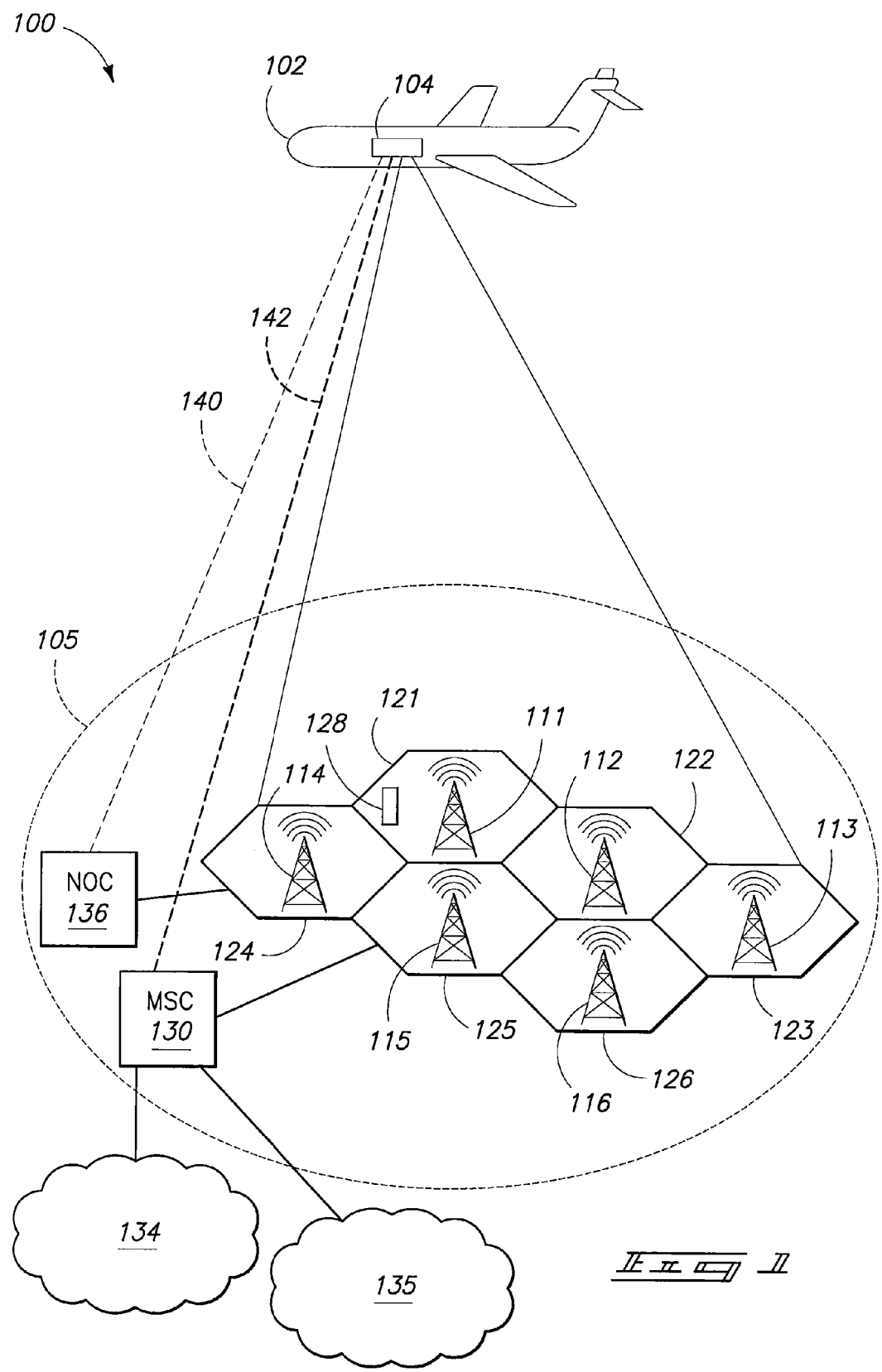
FIG. 1 is an illustrative representation of a communication system according to one embodiment.

This disclosure of the invention is submitted in furtherance of the constitutional purposes of the U.S. Patent Laws "to promote the progress of science and useful arts." (Article 1, Section 8).

According to some embodiments of the disclosure, apparatus and methods for airborne communication are described. In one embodiment, an airborne wireless communication system provides wireless communication service within a geographical area associated with a disabled terrestrial wireless communication base station. The airborne wireless communication system may continue to provide the wireless communication service as an airborne vehicle carrying the airborne wireless communication system moves. In one embodiment, an airborne wireless communication system may answer 911 emergency phone calls. Additional aspects of the disclosure are described in the illustrative embodiments below.

According to one embodiment, an airborne wireless communication system comprises circuitry configured to access information describing a configuration of a terrestrial wireless communication base station that has become disabled. The terrestrial base station is configured to implement wireless communication between wireless devices located within a geographical area and a network when the terrestrial base station is not disabled. The circuitry is further configured, based on the information, to configure the airborne wireless communication system to have the configuration of the terrestrial base station.

According to another embodiment, an airborne wireless communication system comprises circuitry configured to first access first information regarding a geographical area in which a terrestrial base station is configured to provide wireless communication, second access second information regarding a moving airborne vehicle comprising the airborne wireless communication system, use the first and second information to control the airborne wireless communication system so that a coverage area of the airborne wireless communication system includes the geographical area as the airborne vehicle moves, and implement wireless communication between wireless communication devices located within the geographical area and a network using the airborne wireless communication system.

According to another embodiment, a communication method comprises using a terrestrial wireless communication base station, first implementing wireless communication between wireless devices located within a geographical area and a network at a first moment in time and using an airborne wireless communication system, second implementing wireless communication between the wireless devices and the network at a later second moment in time.

According to another embodiment, an airborne communication method comprises first accessing first information regarding a geographical area in which a terrestrial base station is configured to provide wireless communication, second accessing second information regarding a moving airborne vehicle comprising an airborne wireless communication system, and using the first and second information, configuring the airborne wireless communication system so that a coverage area of the airborne wireless communication system includes the geographical area as the airborne vehicle moves.

According to another embodiment, an airborne communication method comprises answering a 911 call from a terrestrial wireless phone using an airborne wireless communication system.

Referring to FIG. 1, a communication system 100, according to one embodiment, is illustrated. System 100 includes an airborne vehicle 102, (e.g., an airplane, helicopter, stratospheric blimp, tethered aerostat, unmanned aircraft, balloon, high altitude long endurance aircraft, fast moving aircraft, etc.) carrying an airborne wireless communication system 104. System 100 further includes a wireless communication network 105. In one configuration, airborne vehicle 102 is located within the Earth's atmosphere and may be located an appropriate distance with respect to the ground (e.g., between 5,000 feet and 70,000 feet) to receive communication from terrestrial wireless communication devices. In one embodiment, examples of terrestrial wireless communication devices include devices capable of wireless communication within a terrestrial cellular network and may include cellular phones, BLACKBERRY® devices, smartphones, laptops, mobile broadband cards, etc.

In one example cellular telephone arrangement, wireless communication network 105 includes a plurality of terrestrial base stations 111, 112, 113, 114, 115 and 116; a Network Operations Center (NOC) 136 (sometimes referred to as a Mobile Telephone Switching Office); and a Mobile Switching Center (MSC) 130. MSC 130 may be connected to a voice network 134 (e.g., the public switched telephone network or an Integrated Services Digital Network (ISDN)) and/or a data network 135 (e.g., the Internet).

Each of the plurality of terrestrial base stations may provide wireless communication service within a geographical area. For example, terrestrial base station 111 may provide wireless communication within geographical area 121. Similarly, terrestrial base stations 112, 113, 114, 115 and 116 may provide wireless communication within geographical areas 122, 123, 124, 125 and 126, respectively. Although the geographical areas of FIG. 1 are illustrated as hexagons of approximately the same size, individual ones of the geographical areas may each be different sizes and different shapes.

The terrestrial base stations 111, 112, 113, 114, 115 and 116 may provide wireless communication service to wireless communication devices (e.g., cellular phones, smart phones, laptops, etc.) such as wireless communication device 128. As used herein, the term terrestrial base station includes a terrestrial Base Transceiver Station (BTS), a terrestrial access point, and a terrestrial Node B. Terrestrial base station 111 provides wireless communication service to wireless communication device 128 in the example of FIG. 1. For example, the wireless communication service may be a telephone service. In this example, wireless communication device 128 may communicate voice information wirelessly with terrestrial base station 111. Terrestrial base station 111 may relay the voice information via a communication link to MSC 130, which may then relay the voice information to voice network 134. Alternatively, the wireless communication service may be a data service in which data from wireless communication device 128 may be relayed by MSC 130 to data network 135 via wireless communication network 105.

A plurality of configuration parameters may influence the manner in which the terrestrial base stations 111, 112, 113, 114, 115 and 116 provide wireless communication service to their respective geographical areas 121, 122, 123, 124, 125 and 126. Some of these configuration parameters may influence the sizes and shapes of the geographical areas 121, 122, 123, 124, 125 and 126. For example, a location of terrestrial base station 111 and a height, orientation, and type of an antenna of terrestrial base station 111 may influence the size and shape of geographical area 121.

Others of the configuration parameters may influence a signal transmitted by the terrestrial base stations. For example, terrestrial base station 111 may operate according to parameters specifying codes, channels, frequencies, bandwidths, power levels, modulation schemes (e.g., Global System for Mobile Communications (GSM), Code Division Multiple Access (CDMA), Wideband CDMA (W-CDMA), High-Speed Downlink Packet Access (HSDPA), Worldwide Interoperability for Microwave Access (WiMAX), or Wireless Fidelity (Wi-Fi)), and the like. Wireless communication device 128 may also operate according to these signal parameters to communicate with terrestrial base station 111.

Individual ones of the terrestrial base stations 111, 112, 113, 114, 115 and 116 may operate using different values for the configuration parameters described above. For example, terrestrial base station 111 may operate using a first frequency, and terrestrial base station 112 may operate using a different second frequency. In one embodiment, the configuration parameter values of the terrestrial base stations 111, 112, 113, 114, 115 and 116 may be known to or stored by NOC 136 and/or MSC 130.

One or more of the terrestrial base stations 111, 112, 113, 114, 115 and 116 may become disabled for a significant amount of time. For example, a natural disaster or other event may interrupt power to one of the terrestrial base stations or may damage the antenna of one of the terrestrial base stations. Consequently, wireless communication devices may be unable to communicate with the disabled terrestrial base station. For example, if terrestrial base station 111 becomes disabled, wireless communication device 128, which is located in geographical area 121, may no longer be able to communicate with terrestrial base station 111 and may therefore be unable to communicate with voice network 134 and/or data network 135.

If terrestrial base station 111 cannot be readily repaired, airborne wireless communication system 104 may be configured, in one embodiment, to provide wireless communication service for geographical area 121 so that wireless communication device 128 may communicate with voice network 134 and/or data network 135. Airborne wireless communication system 104 may include one or more of a terrestrial base station, a base station controller, or an MSC. To serve geographical area 121, airborne wireless communication system 104 may be configured using parameter values associated with disabled terrestrial base station 111 such as the frequency and modulation type of terrestrial base station 111.

To be configured in such a way to act as a substitute for a disabled terrestrial base station, airborne wireless communication system 104 may access configuration parameter values for terrestrial base station 111. In one embodiment, airborne wireless communication system 104 may retrieve the configuration parameter values from NOC 136 via a wireless communication channel 140 or MSC 130 via a wireless communication channel 142. Upon accessing the configuration parameter values for terrestrial base station 111, airborne wireless communication system 104 may configure itself to operate according to the configuration parameter values. Once airborne wireless communication system 104 has been configured with the configuration parameter values of terrestrial base station 111, airborne wireless communication system 104 may provide wireless communication service to geographical area 121.

For example, airborne wireless communication system 104 may receive wireless communication from wireless communication device 128 (located in geographical area 121) and relay the communication to MSC 130 via a wireless communication channel 142. MSC 130 may then forward the communication to voice network 134 and/or data network 135. Consequently, in one embodiment, airborne wireless communication system 104 enables wireless communication device 128 to communicate with voice network 134 and/or data network 135 despite the fact that terrestrial base station 111 is disabled.

In one embodiment, airborne wireless communication system 104 may be configured with the configuration parameter values of more than one disabled terrestrial base station. For example, if terrestrial base stations 111 and 113 are both disabled, airborne wireless communication system 104 may access configuration parameter values for both terrestrial base station 111 and terrestrial base station 113 and may then configure airborne wireless communication system 104 with configuration parameter values for terrestrial base station 111 and with configuration parameter values for terrestrial base station 113.

Consequently, airborne wireless communication system 104 may simultaneously implement communication between wireless communication devices located in geographical area 121 and MSC 130 and may also implement communication between wireless communication devices located in geographical area 123 and MSC 130.

In one embodiment, airborne wireless communication system 104 may be operated by a network operator that also operates wireless communication network 105. Alternatively, airborne wireless communication system 104 may be operated by someone other than the operator that operates wireless communication network 105. For example, airborne wireless communication system 104 may be operated by a governmental agency responsible for communication during times of emergency. In this example, the network operator of wireless communication network 105 may cooperate with the governmental agency by providing configuration parameter values for disabled terrestrial base stations to the governmental agency for use in the airborne wireless communication system 104.

In one embodiment, airborne wireless communication system 104 may provide communication for disabled terrestrial base stations operated by one network operator and provide communication for disabled terrestrial base stations operated by a different network operator. Accordingly, airborne wireless communication system 104 may simultaneously implement communication between first wireless communication devices associated with a first wireless communication network operated by a first operator and implement communication between second wireless communication devices associated with a second wireless communication network operated by a second operator. The first wireless communication devices may be configured to operate using a first modulation scheme and the second wireless communication devices may be configured to operate using a different second modulation scheme. Consequently, airborne wireless communication system 104 may simultaneously implement communication using two different modulation schemes located in the same or different geographical areas.

To provide wireless communication service in geographical area 121, airborne wireless communication system 104 may, in one embodiment, focus a directional antenna of airborne wireless communication system 104 onto geographical area 121. To do so, airborne wireless communication system 104 may first access configuration parameter values describing geographical area 121. For example, airborne wireless communication system 104 may request information such as the antenna height, orientation, and type of the antenna of terrestrial base station 111, as well as the location of terrestrial base station 111, from NOC 136 or MSC 130.

Upon receiving the information, airborne wireless communication system 104 may use the information to determine boundaries of geographical area 121 and may then configure the directional antenna to provide coverage in geographical area 121. Alternatively, NOC 136 or MSC 130 may provide the boundaries of geographical area 121 to airborne wireless communication system 104.

In one embodiment, airborne wireless communication system 104 may configure the directional antenna to provide coverage substantially only in geographical area 121. Doing so may reduce interference between airborne wireless communication system 104 and a terrestrial base station of wireless communication network 105 that may be using the same frequency or code as airborne wireless communication system 104.

In one embodiment, airborne vehicle 102 may remain substantially stationary. Accordingly, once airborne wireless communication system 104 has focused the directional antenna on geographical area 121, airborne wireless communication system 104 might not need to refocus the directional antenna unless airborne vehicle 102 moves. However, in other embodiments, airborne vehicle 102 may travel in an orbit near wireless communication network 105. For example, if airborne vehicle 102 is an airplane, the airplane may not be able to remain stationary and therefore may orbit near wireless communication network 105.

Figure 2:
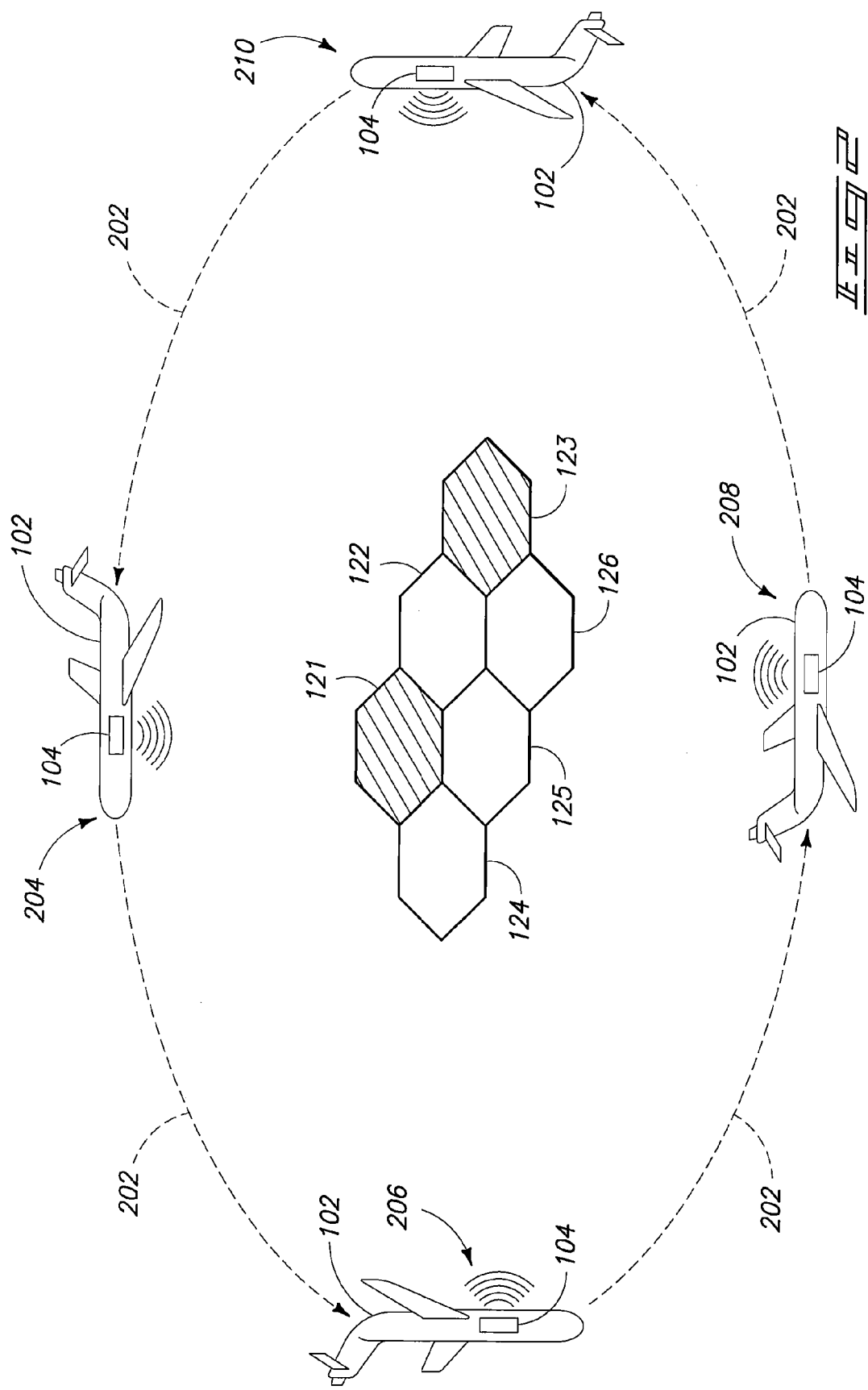
FIG. 2 is a diagram illustrating communication restoration according to one embodiment.

Referring to FIG. 2, airborne vehicle 102 is illustrated traveling in an orbit 202 near wireless communication network 105. By way of example, geographical areas 121 and 123 are shaded to indicate that terrestrial base stations 111 and 113 are disabled and therefore unable to provide wireless communication service to geographical areas 121 and 123. Thus, in this example, airborne wireless communication system 104 is configured to provide wireless communication service for geographical areas 121 and 123.

At position 204, airborne wireless communication system 104, in one embodiment, may focus one directional antenna of airborne wireless communication system 104 on geographical area 121 and another directional antenna of airborne wireless communication system 104 on geographical area 123. In another embodiment, airborne wireless communication system 104 may comprise an adaptive array antenna configured to simultaneously focus two or more signals each in different directions and airborne wireless communication system 104 may configure the adaptive array antenna to communicate signals with respect to geographical area 121 and communicate signals with respect to geographical area 123. Other antenna configurations are also possible.

As airborne vehicle 102 moves, airborne wireless communication system 104 may adjust the configuration of one or more antennas of airborne wireless communication system 104 so that airborne wireless communication system 104 continues to transmit signals covering geographical areas 121 and 123 despite the fact that airborne vehicle 102 is changing position relative to geographical areas 121 and 123. In one embodiment, airborne wireless communication system 104 may access information regarding the position and/or movement of airborne vehicle 102. For example, airborne wireless communication system 104 may retrieve information such as the position, direction, speed, and orientation from airborne vehicle 102. Airborne wireless communication system 104 may use the retrieved information to configure one or more antennas of airborne wireless communication system 104 so that the one or more antennas continue to cover geographical areas 121 and 123 as airborne vehicle 102 moves through orbit 202 passing through positions 204, 206, 208, and 210. Consequently, airborne wireless communication system 104 may implement wireless communication between devices located in geographical areas 121 and 123 and MSC 130 as airborne vehicle 102 moves through orbit 202.

Airborne wireless communication system 104 may receive information from NOC 136 via wireless channel 140 while airborne vehicle 102 is orbiting regarding status of the terrestrial base stations of wireless communication network 105. For example, NOC 136 may inform airborne wireless communication system 104 that terrestrial base station 111 is now operational. In response, airborne wireless communication system 104 may discontinue providing wireless communication service in geographical area 121 but may continue providing wireless communication service in geographical area 123. By discontinuing the wireless service soon after terrestrial base station 111 becomes operational, airborne wireless communication system 104 reduces the possibility of interference between signals transmitted by airborne wireless communication system 104 and terrestrial base station 111.

Figure 3:
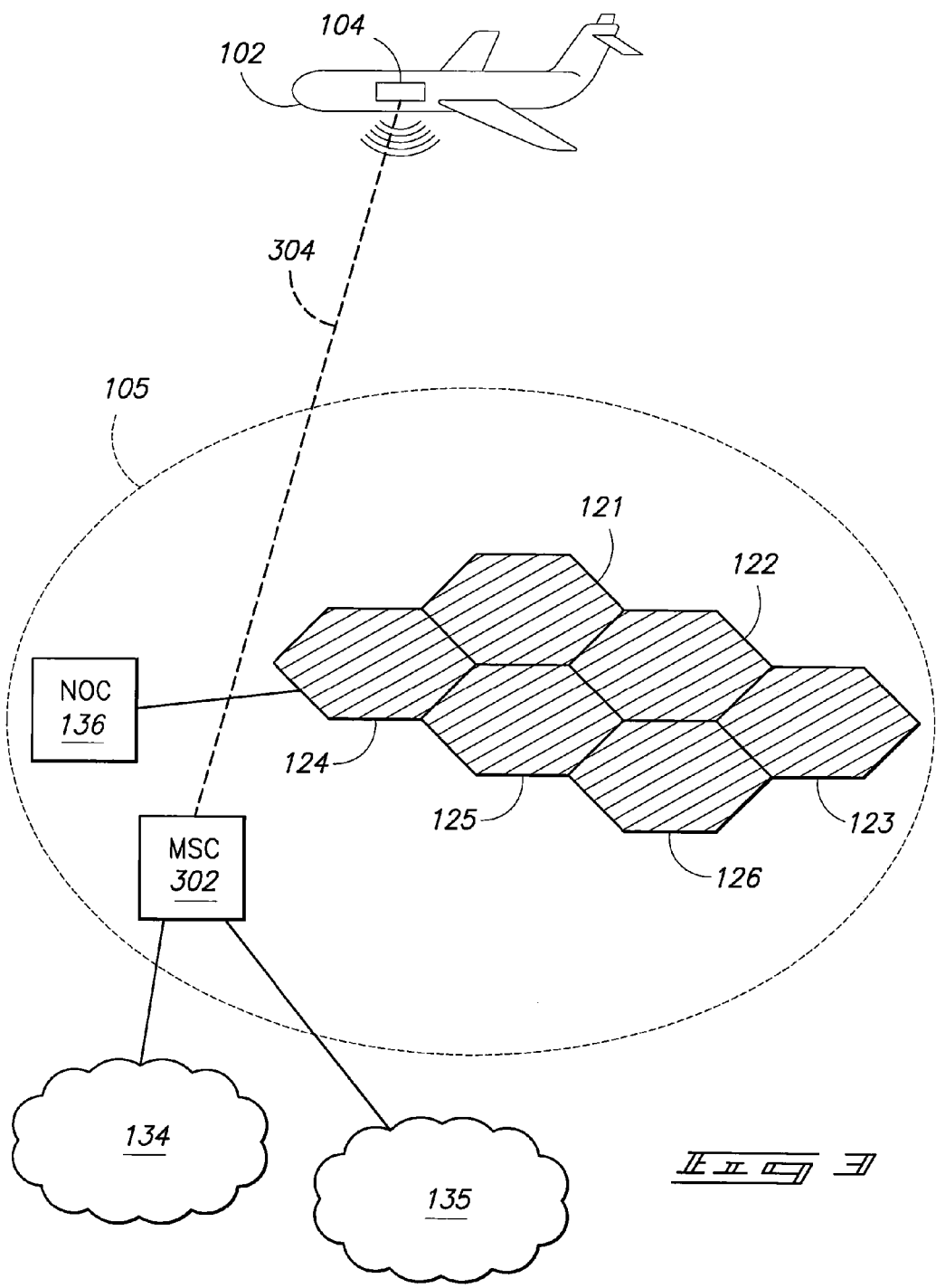
FIG. 3 is an illustrative representation of a communication system according to one embodiment.

Referring to FIG. 3, an alternative configuration of wireless communication network 105 is illustrated in which MSC 130 is disabled. MSC 130 may be disabled, for example, due to physical damage resulting from a natural disaster. Consequently, terrestrial base stations 111, 112, 113, 114, 115 and 116 are also disabled since MSC 130, which connects the terrestrial base stations 111, 112, 113, 114, 115 and 116 to voice network 134 and/or data network 135, is disabled. Accordingly, geographical areas 121, 122, 123, 124, 125 and 126 are illustrated with shading in FIG. 3 to indicate that terrestrial base stations 111, 112, 113, 114, 115 and 116 are disabled. In this configuration, airborne wireless communication system 104 may provide wireless communication service to geographical areas 121, 122, 123, 124, 125 and 126.

In one embodiment, wireless communication network 105 may include temporary MSC 302, which may be configured to replace disabled MSC 130. MSC 302 may be a mobile MSC that can be transported to an area impacted by a natural disaster. Alternatively, MSC 302 may be a permanent facility not necessarily located near MSC 130. Like MSC 130, MSC 302 may be connected to voice network 134 and/or data network 135. In providing wireless communication service to geographical areas 121, 122, 123, 124, 125 and 126, airborne wireless communication system 104 may implement wireless communication between devices located in geographical areas 121, 122, 123, 124, 125 and 126 and MSC 302 via a wireless communication link 304. In one embodiment, wireless communication link 304 may be a satellite communication link.

In another embodiment, airborne wireless communication system 104 may include a terrestrial base station, a base station controller, and an MSC. In this embodiment, airborne wireless communication system 104 may communicate with a ground station (not illustrated) via link 304. The ground station may be connected to voice network 134 and/or data network 135 and may be configured to receive voice or data information from airborne wireless communication system 104. In this embodiment, airborne wireless communication system 104 may implement communication between devices located in geographical areas 121, 122, 123, 124, 125 and 126 and voice network 134 and/or data network 135 via the ground station.

Figure 4:
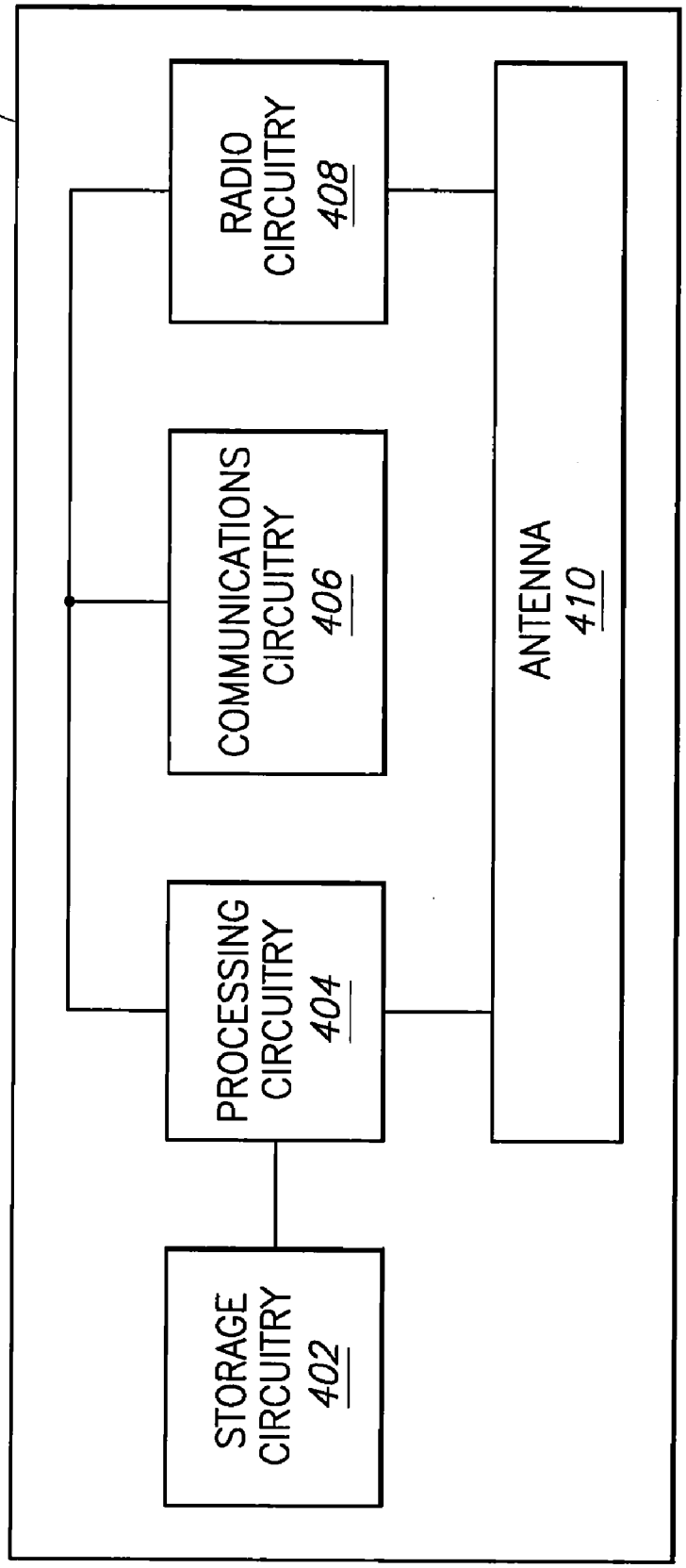
FIG. 4 is a block diagram of an airborne wireless communication system according to one embodiment.

Referring to FIG. 4, a block diagram of one embodiment of airborne wireless communication system 104 is illustrated. Airborne wireless communication system 104 may include storage circuitry 402, processing circuitry 404, communication circuitry 406, radio circuitry 408, and an antenna 410. As was mentioned above, airborne wireless communication system 104 may additionally include a base station controller and/or an MSC, neither of which are illustrated in FIG. 4.

Processing circuitry 404 may comprise circuitry configured to implement desired programming provided by appropriate media in at least one embodiment. For example, processing circuitry 404 may be implemented as one or more of a processor and/or other structure configured to execute executable instructions including, for example, software and/or firmware instructions, and/or hardware circuitry. Exemplary embodiments of processing circuitry 404 include hardware logic, PGA, FPGA, ASIC, state machines, and/or other structures alone or in combination with a processor. These examples of processing circuitry 404 are for illustration and other configurations are possible.

Processing circuitry 404 may be configured to access configuration information (e.g., configuration parameter values) for terrestrial base stations and use the configuration information to configure radio circuitry 408 so that radio circuitry 408 is configured similarly to one or more disabled terrestrial base stations as was described above in relation to FIG. 1. In one embodiment, processing circuitry 404 may use communication circuitry 406 to request and/or receive configuration information from NOC 136 or MSC 130. In another embodiment, the configuration information may be stored in storage circuitry 402 and processing circuitry 404 may access the configuration information by requesting it from storage circuitry 402. Processing circuitry 404 may also, in one embodiment, access data regarding position and/or movement of airborne vehicle 102 and data regarding geographical locations of disabled terrestrial base stations and control antenna 410 to focus antenna 410 on one or more geographical areas of the disabled terrestrial base stations.

In one embodiment, storage circuitry 402 may contain configuration information for many or even all of the terrestrial base stations of a wireless communication network. The configuration information may be copied from a repository of configuration information. The repository may be maintained by a wireless network operator and may store configuration information for many or all of the terrestrial base stations operated by the network operator. The repository may be stored away from an MSC so that if the MSC is damaged or destroyed, the configuration information may still be intact.

Prior to or after becoming airborne, in one embodiment, storage circuitry 402 may be loaded with configuration information for many or all of the terrestrial base stations within communication range of airborne wireless communication system 104. Using this approach, NOC 136 may let airborne wireless communication system 104 know which terrestrial base stations are disabled. In response, processing circuitry 404 may retrieve configuration information for the disabled terrestrial base stations from storage circuitry 402 rather than having to retrieve the configuration information from NOC 136 or MSC 130.

Storage circuitry 402 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, Flash memory, cache memory, and/or other configurations capable of storing programming, data, or other digital information.

At least some embodiments or aspects described herein may be implemented using programming stored within appropriate processor-usable media and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communication interface, or provided using other appropriate communication structure or medium. Exemplary programming including processor-usable code may be communicated as a data signal embodied in a carrier wave in but one example.

Communication circuitry 406 may communicate with NOC 136, MSC 130, and/or MSC 302 via a wireless communication channel such as channels 140, 142, or 304. In one embodiment, communication circuitry 406 may be satellite communication circuitry configured to communicate with NOC 136, MSC 130, and/or MSC 302 via a satellite. Communication circuitry 406 may forward information it receives to processing circuitry 404.

Radio circuitry 408 is configured to communicate with wireless communication devices (e.g., wireless communication device 128) located in one or more of the geographical areas of FIG. 1 via wireless links. Radio circuitry 408 may be configured by processing circuitry 404 according to configuration information associated with a disabled terrestrial base station. Furthermore, as was discussed above, radio circuitry 408 may be configured according to configuration information from more than one disabled terrestrial base station. In one embodiment, radio circuitry 408 is substantially similar to radio circuitry located in the terrestrial base stations of FIG. 1.

Upon demodulating wireless communication received from a wireless communication device, radio circuitry 408 may forward the demodulated communication to communication circuitry 406, which may in turn modulate and forward the communication to MSC 130 or MSC 302 (or to a ground station as was mentioned above). Similarly, communication circuitry 406 may receive wireless communication from MSC 130 or MSC 302. Upon demodulating the communication, communication circuitry 406 may forward the communication to radio circuitry 408, which may then modulate and transmit the communication to a terrestrial wireless communication device (e.g., wireless communication device 128) via antenna 410. In one embodiment, a modulation/demodulation scheme used between radio circuitry 408 and wireless communication device 128 may be different from a modulation/demodulation scheme used between communication circuitry 406 and MSC 130 or MSC 302.

As was discussed above, in one embodiment, antenna 410 may be an adaptive array antenna that is configured to be electronically steered to create a desired directional radiation pattern. For example, antenna 410 may be a phased array, a smart antenna, or a beam-forming antenna. In some configurations of airborne wireless communication system 104, multiple antennas may be used.

In the above discussion, techniques have been described that provide wireless communication services to wireless communication devices (e.g., cellular phones) during times when a terrestrial base station is disabled. In emergency situations, techniques for using an airborne wireless communication system to handle phone calls requesting emergency services (e.g., 911 calls) may be of benefit. Such techniques are described below.

Referring to FIG. 5, an emergency communication system 500 according to one embodiment is illustrated. System 500 includes airborne vehicle 102, an airborne emergency communication system 501, a satellite 518, an emergency responder 532, terrestrial base station 111, a public safety answering point (PSAP) (i.e., a 911 operator) 522, and an emergency operations center (EOC) 526.

In one embodiment, airborne emergency communication system 501 may communicate with wireless communication device 128 when terrestrial base station 111 is disabled. More specifically, airborne emergency communication system 501 may answer phone calls made to reserved emergency phone numbers (e.g., 911 phone calls) made by wireless communication device 128. In one embodiment, upon answering an emergency phone call, airborne emergency communication system 501 may connect the phone call to an interactive voice response unit (IVR) allowing a caller who placed the emergency phone call using wireless communication device 128 to hear a pre-recorded message (e.g., a message instructing the caller to hold or a message informing the caller that terrestrial base station 111 is disabled and therefore emergency calls are being handled by airborne emergency communication system 501).

In some embodiments, the IVR may ask the caller to provide information. For example, the IVR may ask the caller what kind of emergency they are reporting (e.g., fire, flood, crime, bodily injury, etc.), the number of people involved in the emergency, the severity of the emergency, and the like.

Airborne emergency communication system 501 may determine information from the emergency phone call such as a phone number of wireless communication device 128 and a location of wireless communication device 128. In one embodiment, airborne emergency communication system 501 may use techniques associated with wireless enhanced 911 services (e.g., GPS location reported by wireless communication device 128) to determine the location of wireless communication device 128.

Airborne emergency communication system 501 may report the phone call information (e.g., location of wireless communication device 128 and phone number of wireless communication device 128) as well as information gathered from the caller by the IVR to emergency personnel on the ground. For example, airborne emergency communication system 501 may transmit the information via satellite 518 to a terrestrial communication device (e.g., a satellite receiver or satellite transceiver) located at PSAP 522 or to a terrestrial communication device located at EOC 526. EOC 526 may be a location where emergency personnel monitor a geographical area affected by a natural disaster. For example, following a hurricane, an EOC may be established where government leaders and emergency response leaders (e.g., police, fire, medical) receive information regarding conditions in the geographical area and based on the information dispatch resources (e.g., first responders such as firefighters, ambulances, police, etc.) to the geographical area. In one embodiment, EOC 526 may receive satellite imagery of the geographical area affected by the natural disaster. Furthermore, EOC 526 may map locations of 911 phone calls using location information provided by airborne emergency communication system 501. PSAP 522 may be a PSAP locate near the geographical area affected by the natural disaster or may be a remotely located PSAP.

PSAP 522 and/or EOC 526 may use the information provided by airborne emergency communication system 501 to determine areas of greatest need. For example, EOC 526 may map the locations of devices making 911 calls answered by airborne emergency communication system 501 using information provided by airborne emergency communication system 501. Further, PSAP 522 and/or EOC 526 may dispatch first responders (e.g., fire, ambulance, police) based on the information received from airborne emergency communication system 501. In one embodiment, PSAP 522 and/or EOC 526 may communicate with a first responder (e.g., emergency responder 532) via satellite 518 and airborne emergency communication system 501. In this case, airborne emergency communication system 501 may communicate wirelessly with emergency responder 532.

In one embodiment, PSAP 522 or EOC 526 may request that airborne emergency communication system 501 provide voice communication with wireless communication device 128. In response, airborne emergency communication system 501 may implement voice communication between wireless communication devices 128 and PSAP 522 and/or EOC 526 using satellite 518 so that emergency personnel may speak with the caller associated with wireless communication device 128. In doing so, airborne emergency communication system 501 might not rely on disabled terrestrial base station 111 or on other portions of wireless communication network 105 to relay the call. In other words, airborne emergency communication system 501 may relay the call independent of wireless communication network 105.

In one embodiment, airborne emergency communication system 501 may enable data communication between wireless communication devices 128 and PSAP 522 and/or EOC 526. For example, airborne emergency communication system 501 may enable text communication between wireless communication device 128 and PSAP 522 and/or EOC 526.

PSAP 522 and/or EOC 526 need not be near geographical area 121. In fact, since airborne emergency communication system 501 may use satellite 518 to communicate with PSAP 522 and/or EOC 526, PSAP 522 and/or EOC 526 may be located a great distance away from geographical area 121 (e.g., in another state). Of course, airborne emergency communication system 501 may alternatively use wireless communication techniques not involving satellite 518 that enable wireless communication between airborne emergency communication system 501 and PSAP 522 and/or EOC 526.

In one embodiment, airborne vehicle 102 may fly in an orbit near wireless communication network 105 when wireless communication network 105 is disabled. In another embodiment, airborne vehicle 102 may fly near a remote area where wireless communication service is weak or non-existent. For example, if a person known to have a wireless communication device (e.g., a cellular phone) is lost in a remote area with weak or non-existent wireless communication service, airborne vehicle 102 may fly near the remote area to receive a phone call made by the person.

Airborne emergency communication system 501, according to one embodiment, includes radio circuitry 408, processing circuitry 512, antenna 410, Voice over Internet Protocol (VoIP) gateway 528, network 514, radio gateway 530, and communication circuitry 516.

In one embodiment, processing circuitry 512 may configure radio circuitry 408 to accept only calls made to a reserved emergency number (e.g., 911) and to reject other calls. This may be done to increase the likelihood that radio circuitry 408 will be available when a wireless communication device such as wireless communication device 128 places a 911 call.

In one embodiment, airborne emergency communication system 501 may enable voice communication between wireless communication devices 128 and PSAP 522 and/or EOC 526. In one embodiment, radio circuitry 408 may receive modulated voice information from wireless communication device 128, convert the modulated voice information to baseband voice information, and provide the baseband voice information to VoIP gateway 528. Processing circuitry 512 may instruct VoIP gateway 528 to convert the baseband voice information into IP packets that may be sent to PSAP 522 and/or EOC 526 via network 514 and communication circuitry 516.

Similarly, in one embodiment, airborne emergency communication system 501 may enable voice communication between PSAP 522 and/or EOC 526 and wireless communication device 128. To do so, processing circuitry 512 may instruct VoIP gateway 528 to convert VoIP packets received from PSAP 522 and/or EOC 526 to baseband voice information and to send the baseband voice information to radio circuitry 408. Radio circuitry 408 may then modulate the baseband voice information and transmit the modulated voice information to wireless communication device 128 using antenna 410.

Similarly, in one embodiment, processing circuitry 512 may enable voice communication between emergency responders 532 and PSAP 522 and/or EOC 526. In one embodiment, processing circuitry 512 may instruct radio gateway 530 to receive modulated voice information from emergency responder 532, convert the modulated voice information to VoIP packets, and provide the VoIP packets to communication circuitry 516, which may then send the VoIP packets to PSAP 522 and/or EOC 526 via satellite 518. In a similar manner, radio gateway 530 may receive VoIP packets from PSAP 522 and/or EOC 526, convert the VoIP packets into modulated voice information, and transmit the modulated voice information to emergency responder 532.

Similarly, in one embodiment, processing circuitry 512 may enable voice communication between emergency responder 532 and wireless communication device 128. In one embodiment, processing circuitry 512 may instruct radio gateway 530 to receive modulated voice information from emergency responder 532, convert the modulated voice information to VoIP packets, and provide the VoIP packets to VoIP gateway 528. Processing circuitry 512 may instruct VoIP gateway 528 to convert the VoIP packets to baseband voice information and send the baseband voice information to radio circuitry 408, which may then modulate the baseband voice information and transmit the modulated baseband voice information to wireless communication device 128 via antenna 410.

In a similar manner, radio circuitry 408 may modulate voice information from wireless communication device 128, may convert the modulated voice information to baseband voice information and send the baseband voice information to VoIP gateway 528. VoIP gateway 528 may convert the baseband voice information to VoIP packets and send the VoIP packets to radio gateway 530, which may then convert the VoIP packets to modulated voice information and transmit the modulated voice information to emergency responder 532.

In one embodiment, processing circuitry 512 may configure antenna 410 so that antenna 410 is focused on a particular geographical area as airborne vehicle 102 travels as was described above. In another embodiment, processing circuitry 512 may configure antenna 410 to radiate and receive in an omnidirectional pattern so that radio circuitry 408 may receive emergency phone calls from a large geographical area.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, applicants consider the disclosure to include, disclose and describe methods that include less, more and/or alternative steps than those methods explicitly disclosed as well as apparatus that includes less, more and/or alternative structure than the explicitly disclosed structure.

The invention claimed is:

1. An airborne wireless communication system, comprising:
   radio circuitry; and
   processing circuitry operably coupled with the radio circuitry, and configured to access configuration information describing a configuration of a specific terrestrial base station in response to receiving a status update that the specific terrestrial base station has become disabled, and further configured to configure the radio circuitry according to the configuration information to replicate the configuration of the specific terrestrial base station, and to enable communication of the radio circuitry with wireless devices within a geographical area and a network of the specific terrestrial base station.

2. The airborne wireless communication system of claim 1, wherein the wireless devices comprise cellular communication devices.

3. The airborne wireless communication system of claim 1, wherein the radio circuitry is configured by the processing circuitry to simultaneously implement wireless communication for at least two different specific terrestrial base stations that use at least two different wireless modulation technologies.

4. The airborne wireless communication system of claim 1, wherein the configuration information comprises channel numbers indicative of radio frequencies used by the specific terrestrial base station to communicate with the wireless devices.

5. The airborne wireless communication system of claim 1, wherein the configuration information comprises at least one of a plurality of modulation schemes used by the specific terrestrial base station to communicate with the wireless devices when the specific terrestrial base station is not disabled.

6. The airborne wireless communication system of claim 1, wherein the configuration information comprises a description of the geographical area of the specific terrestrial base station.

7. The airborne wireless communication system of claim 1, wherein the processing circuitry is further configured to focus a directional antenna of the airborne wireless communication system onto the geographical area.

8. The airborne wireless communication system of claim 1, wherein the processing circuitry is configured to access the configuration information while onboard an airborne vehicle within the atmosphere Earth.

9. The airborne wireless communication system of claim 1, wherein the processing circuitry is configured to access the configuration information from at least one of a Network Operations Center and a Mobile Switching Center.

10. The airborne wireless communication system of claim 1, further comprising storage circuitry, wherein the processing circuitry is configured to access the configuration information from storage circuitry.

11. The airborne wireless communication system of claim 1, wherein the configuration information comprises at least one of a height, an orientation, and a type of an antenna of the specific terrestrial base station.

12. An airborne wireless communication system comprising circuitry configured to:
   access first information regarding a geographical area associated with a specific terrestrial base station in response to receiving a status update that the specific terrestrial base station has become disabled, wherein the specific terrestrial base station is configured to provide wireless communication within the geographical area while the specific terrestrial base station is operational;
   access second information regarding a moving airborne vehicle comprising the airborne wireless communication system;
   use the first information and the second information to control the airborne wireless communication system so that a coverage area of the airborne wireless communication system includes the geographical area as the airborne vehicle moves; and
   implement wireless communication between wireless communication devices located within the geographical area and a network using the airborne wireless communication system while the specific terrestrial base station is disabled.

13. The airborne wireless communication system of claim 12, wherein the circuitry comprises processing circuitry configured to use the first information and the second information to control a directional antenna to cover the geographical area.

14. A communication method, comprising:
   implementing wireless communication between wireless devices and a specific terrestrial base station of a network while the specific terrestrial base station is operational, the wireless devices being located within a geographical area associated with coverage of the specific terrestrial base station;
   receiving a status update regarding the specific terrestrial base station becoming disabled;
   accessing configuration information associated with the specific terrestrial base station in response to receiving the status update that the specific terrestrial base station has become disabled;
   configuring radio circuitry of an airborne wireless communication system to have the configuration of the specific terrestrial base station according to the configuration information of the specific terrestrial base station; and
   implementing wireless communication between the wireless devices and the network through the airborne wireless communication system while the specific terrestrial base station is disabled.

15. The method of claim 14, wherein the wireless devices are cellular communication devices, and wherein implementing wireless communication between the wireless devices and the network through the airborne wireless communication system is implemented in an airborne vehicle within the atmosphere of the Earth.

16. The method of claim 14, wherein implementing wireless communication between the wireless devices and the network through the airborne wireless communication system occurs while the airborne wireless communication system travels in an orbit near the geographical area.

17. The method of claim 14, wherein implementing wireless communication between the wireless devices and the network through the airborne wireless communication system comprises focusing a directional antenna of the airborne wireless communication system onto the geographical area.

18. The method of claim 14, wherein accessing configuration information includes receiving the configuration information from storage circuitry.

19. The method of claim 18, further comprising loading the configuration information on the storage circuitry after the aircraft is airborne.

20. The method of claim 14, wherein accessing configuration information includes receiving the configuration information from at least one of a Network Operations Center and a Mobile Switching Center.

21. The method of claim 14, further comprising:
   receiving a status update regarding the specific terrestrial base station;
   discontinuing wireless communication between the wireless devices and the network through the airborne wireless communication system after the status update indicates that the specific terrestrial base station is again operational.

22. An airborne communication method, comprising:
   receiving a status update indicating a specific terrestrial base station has become disabled from providing wireless communication;
   accessing first information regarding a geographical area associated with the specific terrestrial base station in response to receiving the status update;
   accessing second information regarding a moving airborne vehicle comprising an airborne wireless communication system; and
   using the first information and the second information, configuring the airborne wireless communication system so that a coverage area of the airborne wireless communication system includes the geographical area as the airborne vehicle moves.

23. The method of claim 22, wherein the specific terrestrial base station comprises a cellular terrestrial base station, and further comprising implementing wireless communication between wireless communication devices located within the geographical area and a network using the configured airborne wireless communication system.

24. The method of claim 22, wherein the second information comprises a position of the airborne vehicle.

25. The method of claim 22, wherein the configuring the airborne wireless communication system comprises focusing a directional antenna of the airborne wireless communication system onto the geographical area.

26. The method of claim 22, wherein the coverage area of the airborne wireless communication system is substantially the same as the geographical area.

27. The method of claim 22, wherein the specific terrestrial base station is configured to provide wireless communication between wireless devices located within the geographical area and a switching center of the network during times when the specific terrestrial base station is enabled, and the method further comprising:
   replacing communication between the specific terrestrial base station and the wireless devices with communication between the airborne wireless communication system and the wireless devices during a time that the specific terrestrial base station is disabled; and
   replacing communication between the specific terrestrial base station and the network with communication between the airborne wireless communication system and a temporary switching center of the network during a time that the switching center of the network is disabled.

* * * * *

UNITED STATES PATENT AND TRADEMARK OFFICE
CERTIFICATE OF CORRECTION

PATENT NO. : 8,078,162 B2  
APPLICATION NO. : 11/870357  
DATED : December 13, 2011  
INVENTOR(S) : Juan D. Deaton et al.

Page 1 of 1

It is certified that error appears in the above-identified patent and that said Letters Patent is hereby corrected as shown below:

In the claims:
CLAIM 8, COLUMN 13, LINE 49, change "atmosphere Earth." to --atmosphere of Earth.--

Signed and Sealed this
Twenty-fourth Day of September, 2013

Teresa Stanek Rea
*Deputy Director of the United States Patent and Trademark Office*